United States Patent
Yanagioka

(10) Patent No.: US 8,242,199 B2
(45) Date of Patent: Aug. 14, 2012

(54) RUBBER COMPOSITION FOR TIRE TREAD AND PNEUMATIC TIRE USING THE SAME

(75) Inventor: Masaki Yanagioka, Kodaira (JP)

(73) Assignee: Bridgestone Company, Tokyo (JP)

( * ) Notice: Subject to any disclaimer, the term of this patent is extended or adjusted under 35 U.S.C. 154(b) by 0 days.

(21) Appl. No.: 10/599,151

(22) PCT Filed: Feb. 15, 2005

(86) PCT No.: PCT/JP2005/002256
§ 371 (c)(1),
(2), (4) Date: Sep. 21, 2006

(87) PCT Pub. No.: WO2005/092970
PCT Pub. Date: Oct. 6, 2005

(65) Prior Publication Data
US 2007/0197715 A1   Aug. 23, 2007

(30) Foreign Application Priority Data
Mar. 25, 2004   (JP) .................................. 2004-90138

(51) Int. Cl.
*C08K 3/04*   (2006.01)
(52) U.S. Cl. ..................... 524/495; 423/449.1
(58) Field of Classification Search ............... 524/495; 423/449.1
See application file for complete search history.

(56) References Cited

U.S. PATENT DOCUMENTS

| | | | | |
|---|---|---|---|---|
| 5,484,836 A * | 1/1996 | Kikuchi et al. | ................ | 524/495 |
| 5,985,978 A * | 11/1999 | Kikuchi et al. | ................ | 524/495 |
| 6,058,994 A * | 5/2000 | Amino et al. | ................ | 152/167 |
| 6,197,870 B1 * | 3/2001 | Sakakibara | .................... | 524/496 |
| 6,358,487 B1 * | 3/2002 | Omae et al. | .................... | 423/450 |

FOREIGN PATENT DOCUMENTS

| | | |
|---|---|---|
| JP | 4-108837 A | 4/1992 |
| JP | 8-269360 A | 10/1996 |
| JP | 9-40883 A | 2/1997 |
| JP | 10-036703 A | 2/1998 |
| JP | 10-287769 A | 10/1998 |
| JP | 11-60984 A | 3/1999 |
| JP | 11-269403 A | 10/1999 |
| JP | 2003-96332 A | 4/2003 |
| WO | WO 91/13944 * | 10/1991 |
| WO | 92/04415 A1 | 3/1992 |

* cited by examiner

*Primary Examiner* — Ling Choi
*Assistant Examiner* — John Uselding
(74) *Attorney, Agent, or Firm* — Sughrue Mion, PLLC

(57) ABSTRACT

The invention relates to a rubber composition for a tire tread simultaneously establishing a high wear resistance and a low heat buildup, and more particularly to a rubber composition for a tire tread comprising 10-250 parts by weight of a carbon black per 100 parts by weight of a rubber component, in which said carbon black is produced in a carbon black production step satisfying the following relational equations (1) and (2):

$$2.00 \leq \alpha \leq 9.00 \qquad (1)$$

$$-2.5 \times \alpha + 85.0 \leq \beta \leq 90.0 \qquad (2)$$

when a residence time from the introduction of the starting hydrocarbon into the high-temperature combustion gas flow to the introduction of the quenching medium is t1 (sec), an average reaction temperature for such a time is T1 (° C.), a residence time from the introduction of the quenching medium to the enter of a reaction gas flow into the reaction stop zone is t2 (sec), an average reaction temperature for such a time is T2 (° C.), $\alpha = t1 \times T1$ and $\beta = t2 \times T2$.

9 Claims, 1 Drawing Sheet

RUBBER COMPOSITION FOR TIRE TREAD AND PNEUMATIC TIRE USING THE SAME

This application is a national stage entry of PCT/JP05/02256, filed Feb. 15, 2005, which claims priority to JP 2004-090138, filed Mar. 25, 2004.

TECHNICAL FIELD

This invention relates to a rubber composition for a tire tread and a pneumatic tire using the same, and more particularly to a rubber composition for a tire tread having an excellent wear resistance and a high rebound resilience.

RELATED ART

Carbon black is an industrially useful raw material produced by generating in a furnace under severely controlled conditions or by spraying a starting hydrocarbon into a high temperature combustion gas introduced in a furnace from an exterior to conduct thermal decomposition or partial combustion of the staring hydrocarbon. Since carbon black has a peculiar characteristic capable of spectacularly improving mechanical properties in a composition compounded with rubber, particularly properties such as tensile strength, wear resistance and the like, it is widely used as a reinforcing filler for various rubber products commencing with tires.

The carbon black for rubber compounding largely affects the performances of the rubber composition owing to its physical and chemical characteristics, i.e. a unit particle size constituting carbon black, surface area per unit weight (specific surface area), degree of connecting particles (structure), surface form and the like. Therefore, various carbon blacks having different characteristics are selectively used in accordance with the rubber performances required, environment used and the like.

In the rubber composition used in the ground contact face of the tire, it is an important factor that a resistance to wearing due to the contact with ground during the high-speed running (wear resistance) is excellent and at the same time, the hysteresis loss property due to the repetitive deformation of the rubber composition generated by the contacting with the ground surface is decreased (low heat buildup). However, these two properties are known to be conflicting with each other.

When carbon black having a larger specific surface area or structure is adopted as a means for improving the wear resistance with carbon black for tire tread compounding, there is still a problem because the wear resistance is conflicting with the low heat buildup as mentioned above, so that various carbon blacks having different characteristics are proposed for solving such a problem.

For example, there is proposed an invention that constitutional elements other than carbon included in the carbon black and the surface activity are noticed to specify the sum of hydrogen quantity and oxygen quantity on the surface of the carbon black or a ration thereof (see, for example, JP-A-H04-108837 and JP-A-H10-36703).

Also, there is proposed an invention that an extract component included in the carbon black with a solvent such as pyridine or toluene (heavy tar component) is reduced to improve the dispersibility in rubber or the like, whereby the reinforcing property and wear resistance of the rubber composition are improved (see, for example, JP-A-H10-36703 and JP-A-H09-40883).

Although the reaction process of producing carbon black by the thermal decomposition or partial combustion of the starting hydrocarbon introduced into a high-temperature gas flow is very complicated and a detail thereof is not still elucidated, there is disclosed that when the conditions of forming carbon black are generally constant, low aromatic hydrocarbon-containing carbon black having a UV absorbance of not more than 0.15 is obtained by turning off from an introduction position of a quenching medium for stopping the carbon black forming reaction and decreasing the amount of water stopping the reaction (see, for example, JP-A-H08-269360). Since such an invention is concerned with a production process of a coloring carbon black, when the resulting carbon black is exposed to a high-temperature atmosphere for a long time, the surface activity is generally lowered, so that there is a fear of deteriorating the properties such as wear resistance, low heat buildup and the like as the rubber composition.

DISCLOSURE OF THE INVENTION

Heretofore, the particle size or structure of the carbon black compounded in the rubber composition constituting the tire is generally considered to be a dominant factor for improving the wear resistance of the tire, and there is known that as the particle size of the carbon black becomes smaller, the wear resistance is improved, but when the particle size of the carbon black is extremely small, the poor dispersion in rubber is caused to increase the heat buildup. If such a rubber composition is used to prepare a tire tread, the wear resistance is excellent, but the low fuel consumption is poor. That is, as to the particle size of the carbon black, there is a conflicting relation between the wear resistance and the low heat buildup. Also, as the structure is increased, there is a tendency of improving the wear resistance, but there is a problem that when the structure is too increased, the processability and resistance to chipping are deteriorated and further the heat buildup increases. Furthermore, when the amount of the carbon black compounded is increased, the wear resistance is improved to a certain extent, but there is the same fear as in the case of increasing the structure (deterioration of the processability and the like).

In light of the above problems, therefore, it is an object of the invention to provide a rubber composition for a tire tread establishing a high wear resistance and a low heat buildup and a pneumatic tire using the same.

The inventors have noticed the residence time or average reaction temperature of the starting hydrocarbon or the like in the production step of carbon black and made various studies in order to achieve the above object. As a result, it has been found that carbon black having excellent wear resistance and low heat buildup can be produced by defining a product indicating heat applied at what temperature for what time at each production step (indication of degree of heat history) and setting a value of this product to a specified range, and as a result, the invention has been accomplished.

A first aspect of the invention lies in a rubber composition for a tire tread comprising 10-250 parts by weight of a carbon black per 100 parts by weight of a rubber component, in which the said carbon black is produced in a carbon black production step using a production furnace wherein a combustion zone, a reaction zone and a reaction stop zone are coaxially connected to each other and including a step of producing a high-temperature combustion gas through the combustion of hydrocarbon fuel in the combustion zone, a step of spraying a starting hydrocarbon into the high-temperature combustion gas flow in the reaction zone to convert the starting hydrocarbon into carbon black through partial combustion or thermal decomposition reaction and a step of quenching the high-temperature combustion gas flow with a quenching medium in the reaction stop zone to complete the reaction, under conditions satisfying the following relational equations (1) and (2):

$$2.00 \leq \alpha \leq 9.00 \tag{1}$$

$$-2.5x\alpha+85.0 \leq \beta \leq 90.0 \tag{2}$$

when a residence time from the introduction of the starting hydrocarbon into the high-temperature combustion gas flow to the introduction of the quenching medium is t1 (sec), an average reaction temperature for such a time is T1 (° C.), a residence time from the introduction of the quenching medium to the enter of a reaction gas flow into the reaction stop zone is t2 (sec), an average reaction temperature for such a time is T2 (° C.), $\alpha=t1 \times T1$ and $\beta=t2 \times T2$.

A carbon black obtained under such a production condition that the $\alpha$ value is less than 2.00 does not give a sufficient reinforcing property to the rubber composition and lowers the wear resistance because a toluene tinting permeability is less than 90% and an extraction amount with monochlorobenzene is more than 0.155 and most of a polyaromatic hydrocarbon component included in the carbon black is existent and such a component does not develop the reinforcing effect to rubber. Also, a carbon black obtained under such a condition that the a value exceeds 9.00, i.e. under a condition of subjecting to an excess heat history at the carbon black reaction step lowers the wear resistance of the rubber composition and undesirably increases the heat buildup because a hydrogen desorption ratio is less than $0.260-6.25 \times 10^{-4} \times CTAB$ (weight %).

Also, a carbon black obtained under such a production condition that the $\beta$ value is less than the value of $-2.5 \times \alpha + 85.0$ even when the a value satisfies the above range, i.e. under a case that the heat history from the introduction of the quenching medium to the reaction stop zone is small has a toluene tinting permeability of less than 90% and an extraction amount with monochlorobenzene of more than 0.15%, while a carbon black obtained under a production condition of subjecting to an excess heat history at the $\beta$ value of more than 90.0 has a hydrogen desorption ratio of less than $0.260-6.25 \times 10^{-4} \times CTAB$ (weight %), so that these carbon blacks are not favorable due to the same reasons as mentioned above.

In the rubber composition for the tire tread according to the first aspect of the invention, the deterioration of the mechanical properties of the rubber composition, particularly wear resistance can be avoided by optimizing the heat history as mentioned above, and hence the high wear resistance and low heat buildup are obtained.

Furthermore, it is preferable that the a value and the $\beta$ value satisfy the following relational equations (3) and (4):

$$3.00 \leq \alpha \leq 8.00 \tag{3}$$

$$-2.5x\alpha+85.0 \leq \beta \leq 86.0 \tag{4}$$

Further, the rubber composition for the tire tread according to the first aspect of the invention is preferable to be compounded with a carbon black produced in the carbon black production step further containing a step of introducing a gaseous body in the reaction zone or the reaction stop zone. As the "gaseous body" may be used air, a mixture of oxygen and hydrocarbon, a combustion gas through the combustion reaction thereof and the like. By introducing such a gaseous body can be adjusted the average reaction temperatures T1 and T2. Moreover, the water amount or the like may be properly adjusted at the position of introducing the quenching medium for adjusting the average reaction temperature T2.

In addition, the rubber composition for the tire tread according to the first aspect of the invention is required to be compounded with a carbon black having a dibutyl phthalate absorption (DBP) of 40-250 ml/100 g and a compressed DBP absorption (24M4 DBP) of 35-220 ml/100 g. When DBP is less than 40 ml/100 g or 24M4 DBP is less than 35 ml/100 g, the tensile stress required as the rubber composition for the tire tread at minimum can not be developed, while when DBP is more than 250 ml/100 g or 24M4 DBP is more than 220 ml/100 g, the elongation required at minimum can not be ensured.

Also, it is preferable to be compounded with a carbon black having a dibutyl phthalate absorption (DBP) of 95-220 ml/100 g and a compressed DBP absorption (24M4 DBP) of 90-200 ml/100 g.

Further, the rubber composition for the tire tread according to the first aspect of the invention is required to be compounded with a carbon black having a cetyltrimethylammonium bromide adsorption specific surface area (CTAB) of 70-200 m²/g. When CTAB is less than 70 m²/g, the minimum tensile strength required as the rubber composition for the tire tread can not be developed, while when it exceeds 200 m²/g, the dispersibility in the rubber composition can ne be ensured sufficiently, and the wear resistance and the like of the rubber composition are deteriorated.

In addition, the rubber composition for the tire tread according to the first aspect of the invention is preferable to be compounded with a carbon black having a tinting strength (TINT)>0.363×CTAB+71.792. In case of the tinting strength (TINT)>0.363×CTAB+71.792 improves the reinforcing property of the rubber with the carbon black. By using this rubber composition for the tire tread according to the first aspect can be particularly improved the wear resistance.

Alternatively, the rubber composition for the tire tread according to the first aspect of the invention is preferable to be compounded with a carbon black having a tinting strength (TINT)<0.363×CTAB+71.792 and (TINT)>50. In case of the tinting strength (TINT)<0.363×CTAB+71.792, the dispersibility of the carbon black in the rubber is improved to contribute to lower the heat buildup of rubber. In case that TINT is not more than 50, the strength and wear resistance practically durable as the tire can not be developed. By using this rubber composition for the tire tread according to the first aspect can be particularly improved the low heat buildup.

Furthermore, the rubber composition for the tire tread according to the first aspect of the invention is preferable to be compounded with a carbon black having a hydrogen desorption ratio>$0.260-6.25 \times 10^{-4} \times CATB$ (wt %). When the ratio is not more than the value of the above relational equation, the wear resistance of the rubber composition for the tire tread lowers and also the heat buildup becomes undesirably high.

In addition, the rubber composition for the tire tread according to the first aspect of the invention is preferable to be compounded with a carbon black having a toluene tinting permeability of not less than 90% and an extraction amount with monochlorobenzene of not more than 0.15%. When the toluene tinting permeability is less than 90% or when the extraction amount with monochlorobenzene exceeds 0.15%, most of a heavy tar component included in the carbon black is existent and such a component does not give the sufficient reinforcing effect to rubber and the wear resistance is undesirably deteriorated.

Moreover, the carbon black compounded in the rubber composition for the tire tread according to the first aspect of the invention is required to be compounded in an amount of 10-250 parts by weight based on 100 parts by weight of the rubber component. When the amount is less than 10 parts by weight, the minimum strength required as the rubber composition for the tire tread can not be developed, while when it exceeds 250 parts by weight, there is caused a problem in the processability but also the minimum elongation required as the rubber composition for the tire tread can not be ensured.

A second aspect of the invention lies in a pneumatic tire using the rubber composition for the tire tread according to the first aspect of the invention in a tread portion.

In the pneumatic tire according to the second aspect of the invention, the wear resistance and the low heat buildup can be improved by applying the above rubber composition to the tread portion.

According to the invention, there can be provided the rubber composition for the tire tread establishing the high wear resistance and the low heat buildup and the pneumatic tire using the same.

BEST MODE FOR CARRYING OUT THE INVENTION

The invention will be described in detail below.
(Production Method of Carbon Black)

Figure 1:
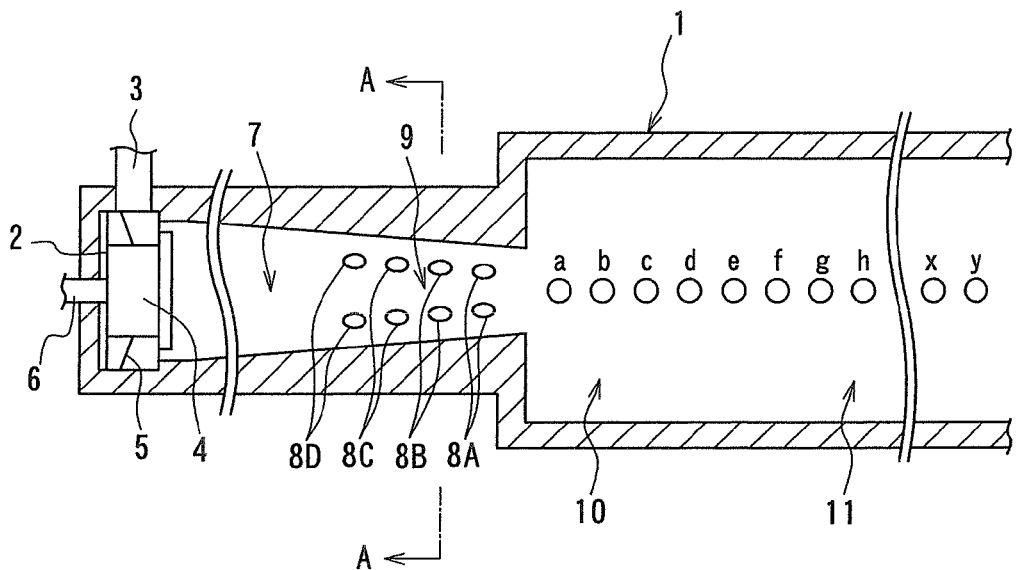
FIG. 1 is a longitudinally sectional front view of a furnace for producing carbon black according to an embodiment of the invention.

The carbon black according to an embodiment of the invention is produced by using a carbon black producing furnace 1 shown in FIG. 1. An interior of the carbon black firing furnace 1 has a structure of coaxially connecting a combustion zone, a reaction zone and a reaction stop zone to each other, and a whole thereof is covered with a refractory.

The combustion zone of the carbon black firing furnace 1 comprises a combustible fluid introducing chamber 2 (inner diameter: 450 mmφ, length: 400 mm), a cylinder 4 for introducing an oxygen-containing gas (inner diameter: 250 mmφ, length: 300 mm) wherein an oxygen-containing gas introduced from an outer periphery of a furnace top portion through an oxygen-containing gas introducing pipe 3 is distributed with a straightening vane and introduced into the combustible fluid introducing chamber 2, and an inlet 6 of a fuel oil spraying apparatus disposed on a center axis of the oxygen-containing gas introducing cylinder and introducing a hydrocarbon for fuel into the combustible fluid introducing chamber 2. In the combustion zone, a high-temperature combustion gas is produced by the combustion of the hydrocarbon for fuel.

Figure 2:
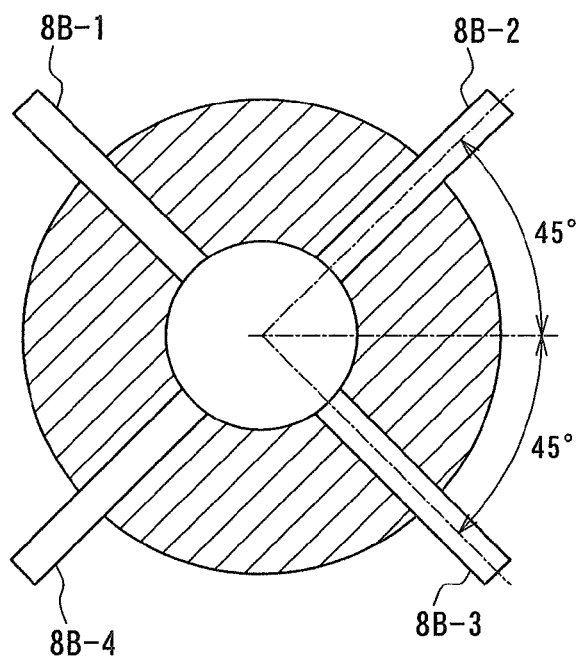
FIG. 2 is a section view taken along a line A-A of FIG. 1.

Also, the reaction zone of the carbon black firing furnace 1 comprises a convergence chamber 7 (inner diameter at upstream side: 370 mmφ, inner diameter at downstream side: 80 mmφ, converging angle: 5.3°) gradually converging the cylinder, a stock oil introducing chamber 9 including four stock oil spraying ports 8A-8D separately formed at the downstream side of the convergence chamber 7, and a reaction chamber 10 disposed at the downstream side of the stock oil introducing chamber 9. The stock oil spraying ports 8A-8D act to spray and introduce the starting hydrocarbon into the high-temperature combustion gas flowed from the combustion zone. As shown in FIG. 2, each of the stock oil spraying ports 8A-8D has four spray openings (8B-1, 8B-2, 8B-3, 8B-4) disposed at an interval of 90 degrees on the same plane. Although the stock oil spraying port 8B is shown in FIG. 2, the other stock oil spraying ports 8A, 8C and 8D have the same construction as mentioned above. In the reaction zone, the starting hydrocarbon is sprayed and introduced into the high-temperature combustion gas flow to convert the starting hydrocarbon into carbon black through partial combustion or thermal decomposition reaction.

Further, the reaction stop zone of the carbon black firing furnace 1 comprises a reaction continuing and cooling chamber 11 (inner diameter: 160 mmφ, length: 7500 mm) having 25 spray devices a-y for pumping a quenching water for the stop of the reaction. The spray devices a-y for pumping the quenching water for the reaction stop spray the quenching medium such as water or the like to the high-temperature combustion gas flow fed from the reaction zone. In the reaction stop zone, the high-temperature combustion gas flow is quenched with the quenching medium to stop the reaction.

Moreover, the carbon black producing furnace 1 may be further provided with an apparatus for introducing a gaseous body in the reaction zone or the reaction stop zone. As the gaseous body may be used air, a mixture of oxygen and hydrocarbon, a combustion gas produced by a combustion reaction thereof, and so on.

In the production step of carbon black according to this embodiment, there are satisfied the following relational equations (1) and (2):

$$2.00 \leq \alpha \leq 9.00 \tag{1}$$

$$-2.5x\alpha + 85.0 \leq \beta \leq 90.0 \tag{2}$$

when a residence time from the introduction of the starting hydrocarbon into the high-temperature combustion gas flow to the introduction of the quenching medium is t1 (sec), an average reaction temperature for such a time is T1 (° C.), a residence time from the introduction of the quenching medium to the enter of the reaction gas flow into the reaction stop zone is t2 (sec), an average reaction temperature for such a time is T2 (° C.), $\alpha = t1 \times T1$ and $\beta = t2 \times T2$. Further, there are preferably satisfied the following relational equations (3) and (4):

$$3.00 \leq \alpha \leq 8.00 \tag{3}$$

$$-2.5x\alpha + 85.0 \leq \beta \leq 86.0 \tag{4}$$

Also, the carbon black producing furnace 1 has a structure capable of inserting thermocouples into the furnace at arbitrary several places for monitoring the temperature inside the furnace. In order to calculate the average reaction temperatures T1 and T2, it is preferable to measure temperatures of at least two places, desirably 3-4 places in each step (each zone).

Further, the residence times t1, t2 are calculated according to the following equations by calculating a volume of reaction gas flow introduced through a well-known thermodynamic calculation process.

Residence time $t1$ = a volume passing through a reaction furnace from a position of introducing a starting hydrocarbon to a position of introducing a quenching medium($m^3$)/a volume of a reaction gas flow($m^3$/sec) (5)

Residence time $t2$ = a volume passing through a reaction furnace from a position of introducing a quenching medium to a reaction stop position ($m^3$)/a volume of a reaction gas flow($m^3$/sec) (6)

(Physical and Chemical Properties of Carbon Black)

The carbon black produced by the aforementioned carbon black producing furnace and carbon black production method has the following characteristics.

In the carbon black according to the embodiment of the invention, the dibutyl phthalate absorption (DBP) is 40-250 ml/100 g and the compressed DBP absorption (24M4 DBP) is 35-220 ml/100 g. More particularly, the dibutyl phthalate absorption (DBP) is 95-220 ml/100 g and the compressed DBP absorption (24M4 DBP) is 90-200 ml/100 g.

Moreover, the dibutyl phthalate absorption (DBP) and the compressed DBP absorption (24M4DBP) are measured by a method described in ASTM D2414-88 (JIS K6217-97) and represented by a volume ml of dibutyl phthalate (DBP) absorbed per 100 g of carbon black.

Also, the cetyltrimethylammonium bromide adsorption specific surface area (CTAB) of the carbon black according to the embodiment of the invention is 70-200 $m^2/g$.

Moreover, the cetyltrimethylammonium bromide adsorption specific surface area (CTAB) is measured by a method described in ASTM D3765-92 and represented by a specific surface area $m^2/g$ per unit weight of carbon black.

Further, the tinting strength (TINT) of the carbon black according to the embodiment of the invention is TINT>0.363×CTAB+71.792. Alternatively, it is TINT<0.363×CTAB+71.792 and TINT>50.

Moreover, the tinting strength (TINT) is measured by a method described in ASTM D3265-88 and represented by a blackness (index) with respect to a standard substance obtained by mixing a predetermined amount of carbon black with zinc oxide and paraffin oil.

In addition, the hydrogen desorption ratio of the carbon black according to the embodiment of the invention is hydrogen desorption ratio>0.260−6.2×10−4×CTAB (wt %).

Moreover, the hydrogen desorption ratio is represented as a mass percentage by measuring an amount of hydrogen gas produced when (1) a carbon black sample is dried in an isothermic drier of 105° C. for 1 hour and cooled to room temperature in a desiccator and (2) about 10 g of the sample is weighed in a tin tubular vessel and pressed and sealed and then (3) the sample is heated at 2000° C. in a stream of an argon form 15 minutes in a hydrogen analytical apparatus (EMGA621W, made by Horiba Seisakusho).

Also, the toluene tinting permeability of the carbon black according to the embodiment of the invention is not less than 90%.

Moreover, the toluene tinting permeability is measured by a method described in Item 8, B-process of JIS K6218:1997 and represented by a percentage to pure toluene.

Further, the extraction amount with monochlorobenzene of the carbon black according to the embodiment of the invention is not more than 0.15%.

Moreover, the extraction amount with monochlorobenzene is measured by using monochlorobenzene as a solvent and conducting the extraction for 30 hours according to Item 9, Solvent extraction of JIS K6218:1997.

(Rubber Composition for Tire Tread)

The rubber composition for the tire tread according to an embodiment of the invention comprises a rubber component, 10-250 parts by weight of the aforementioned carbon black per 100 parts by mass of the rubber component and a softening agent, and may further contains other components properly selected, if necessary.

As the rubber component are mentioned styrene-butadiene copolymer (SBR), natural rubber (NR), butadiene rubber (BR) and the like.

The carbon black is used as a reinforcing filler in the rubber composition, in which carbon blacks having the above characteristics are used. As the carbon black according to this embodiment are mentioned, for example, FEF, SRF, HAF, ISAF, ISAF-LS, SAF-LS and the like.

The softening agent is not particularly limited, and may be properly selected in accordance with the purpose, but an aromatic oil, a low-temperature softening agent, a thermoplastic resin and the like are used. The softening agent may be constituted with a single substance or may be constituted with two or more substances. The latter case is preferable in a point that the temperature dependence of hardness in the rubber composition can be made wiser.

The other components included in the rubber composition may be properly selected and used within a range of not damaging the object of the invention and include, for example, an inorganic filler, a softening agent, a vulcanizing agent such as sulfur or the like, a vulcanization accelerator such as dibenzothiazyl sulfide, N-cyclohexyl-2-benzothiazyl-sulfenamide, N-oxydiethylene-benzothiazyl-sulfenamide or the like, an accelerator activator, an antioxidant such as N-(1,3-dimethylbutyl)-N'-phenyl-p-phenylenediamine or the like, additives such as zinc oxide, stearic acid, an antiozonant, a coloring agent, an antistatic agent, a lubricant, an oxidation inhibitor, a softening agent, a coupling agent, a foaming agent, a foaming assistant and the like, various compounding agents usually used in the rubber industry, and so on. In this case, commercially available products can be preferably used.

(Production of Rubber Composition)

The rubber composition according to the embodiment of the invention can be produced by milling the rubber component, the carbon black and the softening agent and, if necessary, the properly selected other components and then warming, extruding, curing and the like.

The milling conditions are not particularly limited, but the conditions such as volume charged into a milling apparatus, revolution rate of rotor, lam pressure, milling temperature, milling time, kind of milling apparatus and the like can be properly selected in accordance with the purpose. As the milling apparatus are mentioned, for example, a Banbury mixer, an intermix, a kneader and the like, which are usually used in the milling of the rubber composition.

The warming condition is not particularly limited, but various conditions such as warming temperature, warming time, warming apparatus and the like can be properly selected in accordance with the purpose. As the warming apparatus are mentioned, for example, a rolling machine and the like usually used in the warming of the rubber composition.

The extrusion condition is not particularly limited, but various conditions such as extrusion time, extrusion rate, extrusion apparatus, extrusion temperature and the like can be properly selected in accordance with the purpose. As the extrusion apparatus are mentioned, for example, an extruding machine and the like usually used in the extrusion of the rubber composition. The extrusion temperature can be determined properly.

In the extrusion, a process improving agent, for example, a plasticizer such as aromatic oil, naphthemic oil, paraffininc oil, ester oil or the like, a liquid polymer such as liquid polyisoprene rubber, liquid polybutadiene rubber or the like may be properly added to the rubber composition for the purpose of controlling the fluidity of the rubber composition. In this case, the viscosity of the rubber composition prior to the vulcanization can be lowered to enhance the fluidity, and the extrusion can be conducted very effectively.

The apparatus, system, conditions and the like for conducting the vulcanization are not particularly limited, but may be properly selected in accordance with the purpose. As the apparatus for conducting the vulcanization is mentioned, for example, a molding vulcanizer with a mold or the like usually used in the vulcanization of the rubber composition for tires. As the vulcanization conditions, the temperature is usually about 100-190° C.

(Pneumatic Tire)

The pneumatic tire according to an embodiment of the invention can improve the wear resistance and low heat buildup by using the aforementioned rubber composition for the tire tread in a tread portion. Moreover, the pneumatic tire according to this embodiment has a conventionally known structure and is not particularly limited, and can be manufactured by the usual method. Also, as a gas filled in the pneumatic tire according to the embodiment can be used air or air having an adjusted oxygen partial pressure but also an inert gas such as nitrogen, argon, helium or the like.

As an example of the pneumatic tire is preferably mentioned a pneumatic tire comprising a pair of bead portions, a carcass toroidally extending between the bead portions, a belt hooping a crown portion of the carcass and a tread, or the like. The pneumatic tire according to the embodiment of the invention may have a radial structure or a bias structure.

The structure of the tread is not particularly limited, and may has a one layer structure or a multi-layer structure or a so-called cap-base structure constituted with an upper-layer cap portion directly contacting with a road surface and a lower-layer base portion arranged adjacent to the inner side of the cap portion in the pneumatic tire. In this embodiment, it is preferable to form at least the cap portion with the rubber composition according to the embodiment of the invention. The pneumatic tire according to the embodiment is not particularly limited in the manufacturing method and can be manufacture, for example, as follows. That is, the rubber composition according to the above embodiment is first prepared, and the resulting rubber composition attached onto an uncured base portion previously attached to a crown portion of a casing in a green pneumatic tire, and then vulcanization-built in a given mold under predetermined temperature and pressure.

EXAMPLES

The invention will be explained in detail with reference to the following examples, but the invention is not limited to these examples.

Production of Carbon Black

Carbon blacks of Examples 1-10 and Comparative Examples 1-7 are prepared by using the carbon black producing furnace explained in FIGS. 1 and 2. In the carbon black producing furnace, a fuel oil A having a specific gravity of 0.8622 (15° C./4° C.) is used as a fuel, and a heavy oil having properties shown in Table 1 is used as a starting oil.

TABLE 1

| | | |
|---|---|---|
| Specific gravity (JIS K2249)(15/4° C.) | | 1.1319 |
| Kinematic viscosity (JIS K2283)(mm2/s at 50° C.) | | 26.7 |
| Water content (JIS K2275)(%) | | 0.5 |
| Residual carbon (JIS K2210)(%) | | 11.6 |
| Sulfur content (JIS K2213)(%) | | 0.4 |
| Carbon content (%) | | 90.1 |
| Hydrogen content (%) | | 5.4 |
| BMCI *1 | | 160 |
| Distillation characteristics (° C.) | I.B.P. *2 | 188 |
| | 10% cut point | 234 |
| | 30% cut point | 291 |
| | 50% cut point | 360 |

*1 BMCI: Bureau of Mines Correlation Index
*2 I.B.P.: Initial Boiling Point

The operating conditions in the carbon black producing furnace are shown in Tables 2 and 3.

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Conditions for introducing stock oil | Introduction amount (kg/hr) | 295 | 280 | 290 | 255 | 289 | 322 | 275 | 270 | 345 | 350 |
| | Pre-heating temperature (° C.) | 195 | 180 | 195 | 193 | 187 | 185 | 190 | 195 | 178 | 175 |
| Conditions for introducing air | Total air amount introduced (kg/hr) | 1390 | 1382 | 1389 | 1380 | 1400 | 1400 | 1410 | 1415 | 1250 | 1200 |
| | Pre-heating temperature (° C.) | 605 | 600 | 602 | 602 | 608 | 605 | 608 | 610 | 590 | 585 |
| | Amount of fuel introduced (kg/hr) | 68 | 68 | 68 | 70 | 71 | 71 | 72 | 72 | 59 | 56 |
| Residence time t1 (sec) | | 0.0045 | 0.0022 | 0.0045 | 0.0046 | 0.0051 | 0.0052 | 0.0042 | 0.0040 | 0.0062 | 0.0066 |
| Residence time t2 (sec) | | 0.058 | 0.059 | 0.064 | 0.067 | 0.063 | 0.061 | 0.057 | 0.058 | 0.065 | 0.071 |
| Average reaction temperature T1 (° C.) | | 1535 | 1529 | 1535 | 1527 | 1479 | 1449 | 1592 | 1602 | 1351 | 1312 |
| Average reaction temperature T2 (° C.) | | 1375 | 1350 | 1336 | 1172 | 1203 | 1250 | 1365 | 1350 | 1200 | 1210 |
| Reaction ratio α(sec-° C.) | | 6.91 | 3.36 | 6.91 | 7.02 | 7.54 | 7.53 | 6.69 | 6.41 | 8.38 | 8.66 |
| Reaction ratio β(sec-° C.) | | 79.8 | 79.7 | 85.8 | 78.5 | 75.8 | 76.3 | 77.8 | 78.3 | 78.0 | 85.9 |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Conditions for introducing stock oil | Introduction amount (kg/hr) | 290 | 290 | 293 | 313 | 301 | 270 | 273 |
|  | Pre-heating temperature (° C.) | 190 | 190 | 185 | 197 | 180 | 180 | 193 |
| Conditions for introducing air | Total air amount introduced (kg/hr) | 1495 | 1495 | 1390 | 1503 | 1508 | 1118 | 1412 |
|  | Pre-heating temperature (° C.) | 603 | 603 | 603 | 600 | 605 | 608 | 608 |
|  | Amount of fuel introduced (kg/hr) | 73 | 73 | 68 | 77 | 77 | 56 | 72 |
| Residence time t1 (sec) |  | 0.0060 | 0.0060 | 0.0060 | 0.0027 | 0.0011 | 0.0077 | 0.0060 |
| Residence time t2 (sec) |  | 0.057 | 0.057 | 0.057 | 0.060 | 0.060 | 0.081 | 0.082 |
| Average reaction temperature T1 (° C.) |  | 1572 | 1572 | 1572 | 1567 | 1570 | 1495 | 1595 |
| Average reaction temperature T2 (° C.) |  | 1121 | 1121 | 1121 | 1117 | 1115 | 1124 | 1110 |
| Reaction ratio α(sec-° C.) |  | 9.43 | 9.40 | 5.37 | 4.23 | 1.73 | 11.50 | 9.57 |
| Reaction ratio β(sec-° C.) |  | 63.9 | 63.9 | 103.8 | 67.0 | 66.9 | 91.0 | 91.0 |

Tables 2 and 3 show the conditions obtained by adjusting conditions in Examples 1-10 and Comparative Examples 1-7 such as total air amount introduced, stock oil amount introduced, temperature and fuel amount introduced in the carbon black producing furnace, and residence time from the position of introducing the starting hydrocarbon to the position of introducing the quenching medium, average reaction temperature in such a time, residence time from the introduction of the quenching medium to the reaction stop zone, average reaction temperature in such a time, and the like.

Preparation of Rubber Composition

A rubber composition is prepared according to a compounding recipe shown in Table 4 by using carbon blacks produced under the operating conditions shown in Tables 2 and 3 in a Banbury mixer. This rubber composition is vulcanized in a pressure type vulcanizing apparatus at a temperature of 145° C. for 30 minutes.

TABLE 4

| Compounding recipe (parts by weight) | NR *3 | 50 |
|---|---|---|
|  | BR *4 | 50 |
|  | Carbon black | see Tables 5 and 6 |
|  | Antioxidant 6PPD *5 | 1 |
|  | Stearic acid | 2 |
|  | Zinc oxide | 3 |
|  | Vulcanization accelerator BBS *6 | 0.8 |
|  | Vulcanization accelerator DPG *7 | 0.2 |
|  | Sulfur | 1 |
| Tire size |  | 11R22.5 |

*3: RSS#3
*4: cis type BR01, made by JSR Corporation
*5: Nocrac 6C, made by Ohuchi-Shinko Chemical Industrial Co., Ltd. N-(1,3-dimethylbutyl)-N'-phenyl-p-phenylenediamine
*6: made by Ohuchi-Shinko Chemical Industrial Co., Ltd. N-t-butyl-2-benzothiazol sulfenamide
*7: made by Sumitomo Chemical Industrial Co., Ltd. diphenylguanidine Measurement and Test (1) Physical and Chemical Characteristics of Carbon Black The DBP absorption, 24M4DBP absorption, CTAB surface area, TINT, hydrogen desorption ratio, toluene tinting permeability and extraction amount with monochlorobenzene are measured by the methods described in the above embodiment.

(2) Evaluation of Wear Resistance

A tire for a truck comprising a tread portion made from the rubber composition compounded with the respective carbon black is prepared and mounted onto a vehicle. At a time of running over 20,000 km, a decreasing amount of a groove is measured and represented by an index on the basis that Comparative example 1 is 100. Concretely, a loss amount through wearing is measured by means of a Lambourn abrasion tester, from which an index of the wear resistance is calculated according to the following equation.

Wear resistance=loss amount of a rubber test piece as a comparison standard through wearing/loss amount of a rubber piece to be tested through wearing×100

The larger the index value, the better the wear resistance.

(3) Evaluation of Low Heat Buildup

A temperature of a tire tread portion is measured after the tire is run on a steel drum under a constant load for a given time and represented by an index on the basis that Comparative Example 1 is 100. The larger the index value, the better the low heat buildup.

TABLE 5

| | | Example 1 | Example 2 | Example 3 | Example 4 | Example 5 |
|---|---|---|---|---|---|---|
| Physical and chemical characteristics of CB | DBP absorption (ml/100 g) | 157 | 160 | 162 | 175 | 173 |
| | 24M4DBP absorption (ml/100 g) | 114 | 114 | 117 | 116 | 122 |
| | CTAB surface area (m2/g) | 128 | 129 | 140 | 131 | 111 |
| | TINT | 128 | 129 | 129 | 120 | 108 |
| | $0.363 \times$ (CTAB) + 71.792 | 118 | 119 | 123 | 119 | 112 |
| | Hydrogen desorption ratio (%) | 0.23 | 0.23 | 0.23 | 0.23 | 0.21 |
| | $0.260 - 6.25 \times 10^{-4} \times$ (CTAB) | 0.18 | 0.18 | 0.17 | 0.18 | 0.19 |
| | Toluene tinting permeability (%) | 97.3 | 97.8 | 98.5 | 98.0 | 97.3 |
| | Extraction amount with monochlorobenzene (%) | 0.033 | 0.032 | 0.024 | 0.032 | 0.024 |
| Parts by weight of CB (per 100 parts by weight of rubber component) | | 50 | 50 | 50 | 50 | 50 |
| Uncured rubber property | Mooney viscosity (index) | 98 | 99 | 99 | 101 | 94 |
| Properties of vulcanized rubber | Wear resistance (index) | 112 | 113 | 115 | 120 | 108 |
| | Low heat buildup (index) | 102 | 102 | 102 | 100 | 108 |

| | | Example 6 | Example 7 | Example 8 | Example 9 | Example 10 |
|---|---|---|---|---|---|---|
| Physical and chemical characteristics of CB | DBP absorption (ml/100 g) | 170 | 170 | 175 | 72 | 120 |
| | 24M4DBP absorption (ml/100 g) | 123 | 123 | 125 | 68 | 95 |
| | CTAB surface area (m2/g) | 104 | 145 | 152 | 75 | 65 |
| | TINT | 105 | 135 | 138 | 102 | 98 |
| | $0.363 \times$ (CTAB) + 71.792 | 110 | 124 | 127 | 99 | 95 |
| | Hydrogen desorption ratio (%) | 0.24 | 0.23 | 0.20 | 0.26 | 0.27 |
| | $0.260 - 6.25 \times 10^{-4} \times$ (CTAB) | 0.20 | 0.17 | 0.17 | 0.22 | 0.22 |
| | Toluene tinting permeability (%) | 93.5 | 98.5 | 98.7 | 92.0 | 91.0 |
| | Extraction amount with monochlorobenzene (%) | 0.043 | 0.032 | 0.030 | 0.047 | 0.051 |
| Parts by weight of CB (per 100 parts by weight of rubber component) | | 50 | 50 | 50 | 50 | 50 |
| Uncured rubber property | Mooney viscosity (index) | 93 | 108 | 110 | 60 | 55 |
| Properties of vulcanized rubber | Wear resistance (index) | 108 | 120 | 124 | 75 | 45 |
| | Low heat buildup (index) | 112 | 99 | 98 | 116 | 120 |

TABLE 6

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Physical and chemical characteristics of CB | DBP absorption (ml/100 g) | 140 | 140 | 165 | 122 | 127 | 157 | 155 |
| | 24M4DBP absorption (ml/100 g) | 110 | 110 | 112 | 103 | 106 | 116 | 115 |
| | CTAB surface area (m2/g) | 138 | 138 | 129 | 143 | 139 | 111 | 151 |
| | TINT | 128 | 128 | 119 | 130 | 137 | 115 | 138 |
| | $0.363 \times$ (CTAB) + 71.792 | 122 | 122 | 119 | 124 | 122 | 112 | 127 |
| | Hydrogen desorption ratio (%) | 0.16 | 0.18 | 0.15 | 0.30 | 0.29 | 0.17 | 0.15 |
| | $0.260 - 6.25 \times 10^{-4} \times$ (CTAB) | 0.18 | 0.18 | 0.18 | 0.17 | 0.18 | 0.19 | 0.17 |
| | Toluene tinting permeability (%) | 99.8 | 99.8 | 99.9 | 80.5 | 79.5 | 95.9 | 99.8 |
| | Extraction amount with monochlorobenzene (%) | 0.0084 | 0.0084 | 0.0075 | 0.2300 | 0.2400 | 0.0041 | 0.0069 |
| Parts by weight of CB (per 100 parts by weight of rubber component) | | 50 | 55 | 50 | 50 | 50 | 50 | 50 |
| Uncured rubber property | Mooney viscosity (index) | 100 | 118 | 103 | 115 | 111 | 94 | 125 |

TABLE 6-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Properties of vulcanized rubber | Wear resistance (index) | 100 | 105 | 103 | 99 | 96 | 98 | 104 |
|  | Low heat buildup (index) | 100 | 95 | 100 | 95 | 97 | 106 | 90 |

<Results>

The effects of the rubber composition according to the invention will be explained from the production conditions and physical and chemical characteristics of the carbon blacks shown in Tables 2, 3, 5 and 6.

It is understood that Examples 1-10 simultaneously establish the high wear resistance and the low heat buildup as compared with Comparative Examples 1-7. Moreover, the carbon blacks of Examples 1-10 satisfy the equations (3) and (4):

$$3.00 \leq \alpha \leq 8.00 \quad (3)$$

$$-2.5x\alpha + 85.0 \leq \alpha \leq 86.0 \quad (4)$$

and the carbon blacks of Comparative Examples 1-7 do not satisfy the equation (3) or (4). Therefore, it is understood that the rubber composition for the tire tread establishing the high wear resistance and the low heat buildup is obtained satisfying the above equations (3) and (4).

Also, Examples 1-4 and 7-8 are particularly superior in the wear resistance to the other examples. Therefore, it is understood that the compounding properties specializing the wear resistance are obtained in case of the physical and chemical characteristics that the dibutyl phthalate absorption (DBP) is 95-220 ml/100 g and the compressed DBP absorption (24M4DBP) is 90-200 ml/100 g and the cetyltrimethylammonium bromide adsorption specific surface area (CTAB) is 70-200 m2/g and the tinting strength (TINT) is TINT>0.363×CTAB+71.792.

Furthermore, Examples 5 and 6 are particularly superior in the low heat buildup to the other examples. Therefore, it is understood that the compounding properties specializing the low heat buildup are obtained in case of the physical and chemical characteristics that the dibutyl phthalate absorption (DBP) is 95-220 ml/100 g and the compressed DBP absorption (24M4DBP) is 90-200 ml/100 g and the cetyltrimethylammonium bromide adsorption specific surface area (CTAB) is 70-200 m2/g and the tinting strength (TINT) is TINT<0.363×CTAB+71.792 and TINT>50.

Thus, the high wear resistance-specialized rubber composition and the low heat buildup-specialized rubber composition can be prepared by properly controlling the physical and chemical characteristics.

Moreover, Examples 9 and 10 could not simultaneously establish the high wear resistance and the low heat buildup. Therefore, it is understood that the carbon black production conditions satisfy the relational equations (1)-(4) and the physical and chemical characteristics of the carbon black are within predetermined ranges in order to achieve the establishment of the high wear resistance and the low heat buildup.

On the other hand, it is understood that the compositions using the carbon blacks of the comparative examples not satisfying the production conditions and physical and chemical characteristics defined in the invention can not simultaneously establish the high wear resistance and the low heat buildup.

The invention claimed is:

1. A rubber composition for a tire tread comprising 10-250 parts by weight of a carbon black per 100 parts by weight of a rubber component, in which the said carbon black is produced in a carbon black production step using a production furnace wherein a combustion zone, a reaction zone and a reaction stop zone are coaxially connected to each other and including a step of producing a high-temperature combustion gas through the combustion of hydrocarbon fuel in the combustion zone, a step of spraying a starting hydrocarbon into the high-temperature combustion gas flow in the reaction zone to convert the starting hydrocarbon into carbon black through partial combustion or thermal decomposition reaction and a step of quenching the high-temperature combustion gas flow with a quenching medium in the reaction stop zone to complete the reaction, under conditions satisfying the following relational equations (1) and (2):

$$2.00 \leq \alpha \leq 9.00 \quad (1)$$

$$-2.5x\alpha + 85.0 \leq \beta \leq 90.0 \quad (2)$$

when a residence time from the introduction of the starting hydrocarbon into the high-temperature combustion gas flow to the introduction of the quenching medium is t1 (sec), an average reaction temperature for such a time is T1 (° C.), a residence time from the introduction of the quenching medium to the enter of a reaction gas flow into the reaction stop zone is t2 (sec), an average reaction temperature for such a time is T2 (° C.), $\alpha = t1 \times T1$ and $\beta = t2 \times T2$, wherein the carbon black has a hydrogen desorption ratio $>0.260-6.25\times10^{-4}\times$CTAB (wt %), a toluene tinting permeability of not less than 90% and a cetyltrimethylammonium bromide adsorption specific surface area (CTAB) of 111-200 m$^2$/g.

2. A rubber composition for a tire tread according to claim 1, which is compounded with the carbon black produced in the carbon black production step that the α value and the β value satisfy the following relational equations (3) and (4):

$$3.00 \leq \alpha \leq 8.00 \quad (3)$$

$$-2.5x\alpha + 85.0 \leq \beta \leq 86.0 \quad (4)$$

3. A rubber composition for a tire tread according to claim 1, which is compounded with the carbon black produced in the carbon black production step further comprising a step of introducing a gaseous body in the reaction zone or the reaction stop zone.

4. A rubber composition for a tire tread according to claim 1, which is compounded with the carbon black having a dibutyl phthalate absorption (DBP) of 40-250 ml/100 g, a compressed DBP absorption (24M4 DBP) of 35-220 ml/100 g and a cetyltrimethylammonium bromide adsorption specific surface area (CTAB) of 111-200 m$^2$/g.

5. A rubber composition for a tire tread according to claim 4, which is compounded with the carbon black having a dibutyl phthalate absorption (DBP) of 95-220 ml/100 g and a compressed DBP absorption (24M4 DBP) of 90-200 ml/100 g.

6. A rubber composition for a tire tread according to claim 4, which is compounded with the carbon black having a tinting strength (TINT)>0.363×CTAB+71.792.

7. A rubber composition for a tire tread according to claim 4, which is compounded with the carbon black having a tinting strength (TINT)<0.363×CTAB+71.792 and (TINT)>50.

8. A rubber composition for a tire tread according to claim 1, which is compounded with the carbon black having an extraction amount with monochlorobenzene of not more than 0.15%.

9. A pneumatic tire comprising a rubber composition for a tire tread as claimed in claim 1 in a tread portion.

* * * * *